United States Patent
Bertonis et al.

(10) Patent No.: US 6,625,222 B1
(45) Date of Patent: Sep. 23, 2003

(54) APPARATUS AND METHOD FOR HIGH-SPEED WIRELESS UPSTREAM DATA TRANSMISSION USING CATV-COMPATIBLE MODEMS

(75) Inventors: James G. Bertonis, Los Gatos, CA (US); Robert A. Buaas, Huntington Beach, CA (US)

(73) Assignee: ArcWave, Inc., Campbell, CA (US)

( * ) Notice: Subject to any disclaimer, the term of this patent is extended or adjusted under 35 U.S.C. 154(b) by 0 days.

(21) Appl. No.: 09/397,402

(22) Filed: Sep. 16, 1999

(51) Int. Cl.[7] .............................................. H04L 27/00
(52) U.S. Cl. ...................................... 375/259; 725/111
(58) Field of Search ............................ 725/111; 375/259, 375/371, 317; 370/463

(56) References Cited

U.S. PATENT DOCUMENTS

| | | | | |
|---|---|---|---|---|
| 5,550,579 A | * | 8/1996 | Martinez | 725/119 |
| 5,642,155 A | * | 6/1997 | Cheng | 725/119 |
| 5,864,672 A | * | 1/1999 | Bodeep et al. | 725/126 |
| 5,970,053 A | * | 10/1999 | Schick et al. | 370/252 |
| 6,321,384 B1 | * | 11/2001 | Eldering | 725/125 |
| 6,327,709 B1 | * | 12/2001 | Ovadia et al. | 348/192 |

* cited by examiner

Primary Examiner—Chi Pham
Assistant Examiner—Pankaj Kumar
(74) Attorney, Agent, or Firm—Pennie & Edmonds LLP

(57) ABSTRACT

An apparatus and method is described for providing high-speed wireless upstream data transmission using cable-compatible modems. The data is modulated by a cable-compatible modem and upconverted to a wireless channel by a frequency translator. The average field strength of the transmitted signal is constrained by controlling the duty cycle, and may be more accurately constrained by additionally controlling the gain of the frequency translator through feedback. Limiting the average field strength permits transmission over unlicenced wireless channels.

16 Claims, 9 Drawing Sheets

PCT = Power Control Template

APPARATUS AND METHOD FOR HIGH-SPEED WIRELESS UPSTREAM DATA TRANSMISSION USING CATV-COMPATIBLE MODEMS

The present invention relates generally to data transmission over wireless channels, and more specifically to wireless Internet access using cable-compatible modems.

BACKGROUND OF THE INVENTION

The present invention is a method and apparatus for providing upstream data transmission for Internet access over wireless channels using standard or modified modems developed for Internet access over cable channels. At present, most households with Internet access use telephone modems and telephone lines to establish communication with an Internet service provider ("ISP") and access the Internet. The data rate over telephone lines is limited due to limited bandwidth. High speed wireless Internet is available using Local Multipoint Distribution Service (LMDS), but this approach requires a license from the Federal Communications Commission (FCC) and is relatively expensive. Furthermore, the service is not generally available. Therefore, providing Internet access over cable communications system has become an attractive alternative: greater bandwidth is available to provide high data rates, and many households are already connected to a local cable provider.

However, providing full-duplex Internet access via cable requires both a forward channel from the cable provider to the subscribing household (also known as the downstream direction), and a reverse channel from the subscribing household to the cable provider (also known as the upstream direction). Internet data such as web page content is transmitted downstream to the subscriber, and the subscriber transmits data such as requests for web page access or email upstream to the service provider. The subscribing household is equipped with a cable modem with a computer or in a set-top box, which receives and demodulates the downstream data, and modulates and transmits the upstream data.

Although Internet access over cable provides increased speed over telephone access, it is not ideal. Cable systems were originally developed to send information only in the downstream direction—to send television programming from the cable service provider to the subscribing household. Although some cable systems have been modified for upstream transmission, many have not, and must use an alternative such as telephone lines for upstream transmission. Furthermore, some households do not have access to cable. Finally, since local cable systems are by nature monopolistic, competition among ISPs providing service over cable is limited.

For this reason, wireless Internet access is an attractive alternative to access over cable. Recently, ISPs have attempted to provide wireless access at data rates comparable to the data rates available over cable. The current approach to "wireless cable" has been to use multichannel multipoint distribution service ("MMDS") channels. The MMDS channels were originally conceived as an alternative means to cable for providing television service in remote areas. A limited number of wireless channels, with relatively small geographic coverage, were designated for MMDS and auctioned off by the FCC. MMDS proved commercially unsuccessful as a means for providing television service, but some ISPs have purchased the licenses and put the channels to use for providing Internet access over this "wireless cable." The signals over wireless cable are processed to mimic cable signals, so that, unlike LMDS, standard cable modems may be used. The processing is performed using additional equipment, usually in an outdoor unit ("ODU") at the subscriber household.

However, MMDS is not entirely satisfactory. The MMDS wireless cable uses 6 MHZ television channels for upstream and downstream transmission. These channels are relatively closely spaced in frequency. Because the channels are so closely spaced in frequency, a diplexor is required at each household to separate the upstream transmission path and the downstream receive path. Thus, the processing equipment required, including the diplexor, is relatively expensive and cumbersome. Also, the up to two 6 MHZ channels which may be allocated to the reverse direction are the maximum frequency spectrum, which is a significant limitation. In addition, because the MMDS channels are licensed, the ISP must go to the expense of purchasing a license which could cost in the millions of dollars.

The use of unlicenced channels has generally been unattractive for wireless cable. Unlicenced FCC channels typically require the use of spread spectrum. However, spread spectrum is impracticable for the upstream channel, due to the incompatibility of the bursty nature of upstream communications and the synchronization time required for spread spectrum signals. With respect to the downstream channel, spread spectrum is impracticable as well. One approach to spread spectrum is frequency hopping, in which the center frequency of the signal changes in a pseudo-random fashion, at a rate which is less than the bit rate. Frequency hopping cannot be used for downstream transmission because continuous transmission is required in the downstream direction. Another approach to spread spectrum is direct sequence, in which the signal is phase-modulated very rapidly, relative to the bit rate, in a pseudo-random fashion. However, the complex modulation format used for downstream communications would make the use of direct sequence signals complicated and expensive. In addition, commonly employed methods for producing direct sequence signals would occupy a substantial portion of the available bandwidth without permitting the use of code division multiple access (CDMA), and would make the receiver vulnerable to narrowband interference.

There is therefore a need in the art for high-speed wireless Internet access which uses relatively simple, inexpensive equipment in addition to a cable modem or set-top box. Preferably, the Internet access can be provided over wireless channels without the purchase of a license and not requiring the use of spread spectrum.

SUMMARY OF THE INVENTION

In summary, the present invention is an apparatus and method for upstream data transmission in a system which provides Internet access using unlicenced wireless microwave channels—that is, wireless microwave channels which may be used without a license from the FCC. The system uses widely-separated frequency channels for upstream and downstream transmission. Compliance with the FCC requirements is provided through an upstream modulation scheme that controls transmission power levels, while transmitting at the unspread (information) bandwidth, without the use of spread spectrum. Furthermore, the upstream and downstream modulation may be constrained to meet the requirements for a standard cable modem, including a cable modem meeting the DOCSIS standard, the contents of which is hereby incorporated by reference. The use of wireless cable rather than standard cable is transparent to the user.

The upstream portion of the system may be used in a two-way wireless system with both upstream and downstream channels on wireless cable. Alternatively, the upstream portion alone may be used to provide the upstream channel in a cable system which has not been upgraded to include an upstream channel within the cable, sometimes referred to as a "legacy cable network."

An upstream signal, consisting of modulated data, is generated by the cable modem in response to a request from a user, for example to send email or to download a particular webpage. The upstream signal is located within the 5–42 MHZ frequency band assigned by most cable operators for upstream data transmission, referred to as the "upstream frequency band." The upstream signal itself does not occupy the entire 37 MHZ bandwidth, but is contained within a 200 KHz–3.2 MHZ channel within the upstream frequency band.

The upconversion in the subscriber ODU is provided by an upstream frequency translator. The frequency translator upconverts the entire upstream band, 5–42 MHZ, output by the cable modem to a 37 MHZ sub-band within a wireless band. The wireless band is a range of frequencies, such as 2.4–2.4835 GHz, suitable for wireless transmission. The upconverted upstream signal—the "wireless upstream signal"—is then located in a portion of each upconverted 37 MHZ sub-band. For example, if the upstream signal originally occupied the frequencies 30–32 MHZ, and the band 5–42 MHZ is upconverted to 2.4 GHz–2.437 GHz, the wireless upstream signal will be located at 2.430 GHz–2.432 GHz. The wireless upstream signal is then provided to an antenna for wireless transmission.

The frequency translator may upconvert the upstream band to more than one 40 MHZ sub-band within the wireless band: for example, in the band 2.430–2.4835 GHz, the upstream band could be upconverted to both the sub-band 2.4–2.437 GHz and the sub-band 2.4435–2.4831 GHz. The subscriber ODU would then produce the wireless upstream signals at multiple sub-bands for transmission. The headend could then select for processing the sub-band with the least interference, or could combine sub-bands to increase the signal-to-noise ratio.

The wireless band is preferably in an unlicenced channel-a range of transmission frequencies for which the FCC does not require users to purchase a license. The average field strength of the transmitted signal is constrained to be less than a maximum value. If the field strength is properly constrained, it is not necessary to use spread spectrum modulation to satisfy FCC requirements for unlicenced channels. In the present invention, the wireless upstream signal is an unspread signal—i.e., a signal which has not been spread using means such as direct sequence or frequency hopping—with its average field strength constrained through either controlling the duty cycle of the transmitted signal, using a calibrating circuit which is responsive to detected field strength, or both. Because the frequency translator does not spread the upstream signal, the bandwidth of the wireless upstream signal output by the frequency translator is approximately equal to the bandwidth of the upstream signal input to the frequency translator.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
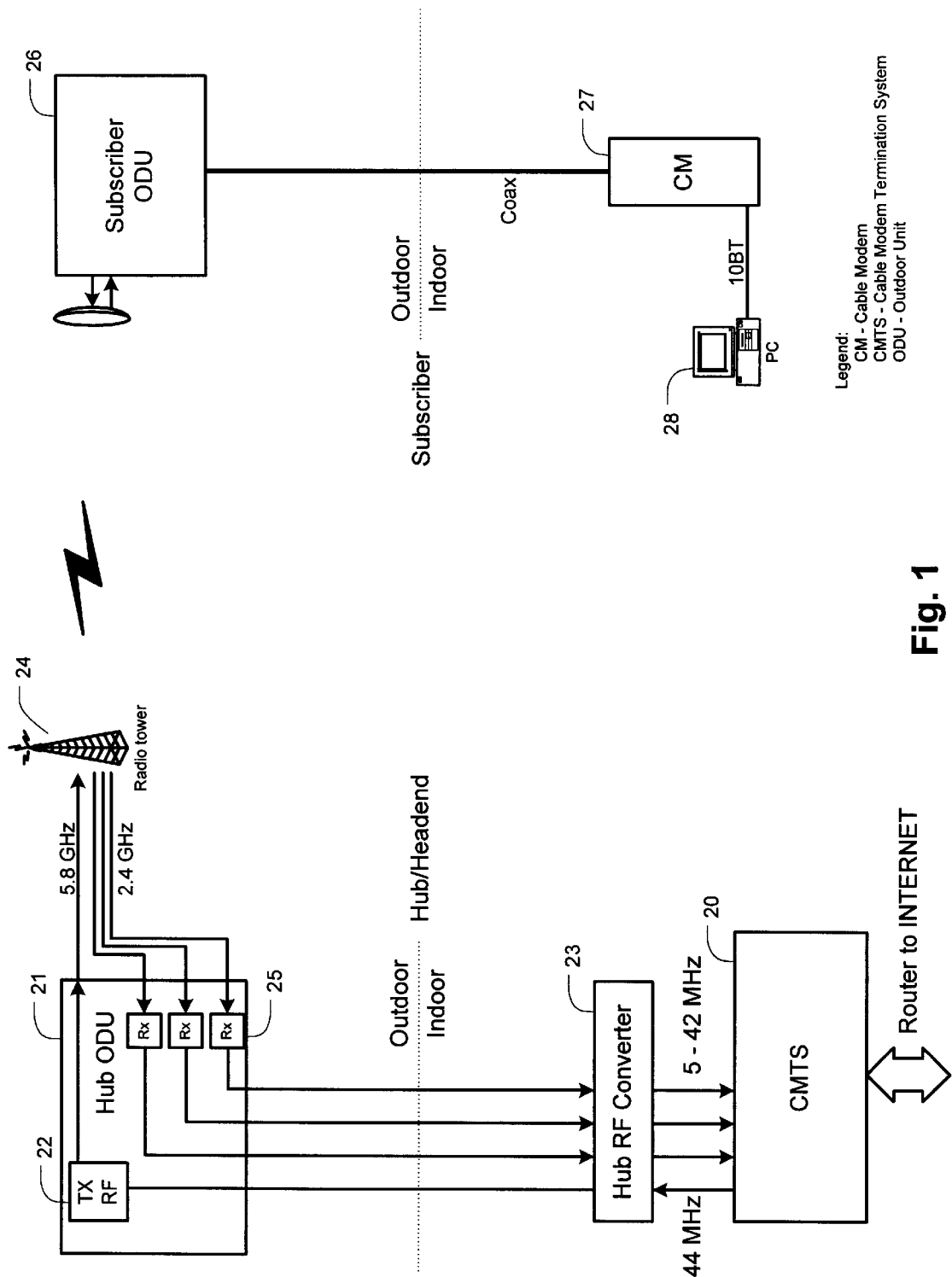
FIG. 1 illustrates a wireless cable system for high-speed wireless Internet access using cable modems in accordance with an embodiment of the present invention.

As shown in FIG. 1, in a wireless cable subscriber system, a standard cable modem termination system (CMTS) 20 may be used at the cable system hub or headend, providing an interface between the Internet and the cable upstream and downstream channels. Typically, a CMTS 20 demodulates upstream signals, translates them into Internet Protocol (IP) packets, and redirects them to a central switch (not shown), which in turn redirects the IP packets to a router (not shown) for Internet transmission. In the downstream direction, a CMTS modulates downstream signals for transmission over cable to a cable subscriber's home. The downstream signals provided by the CMTS may be at a standard cable IF of 44 MHZ, or may be at a downstream transmission frequency of, e.g., 500–600 MHZ. If the CMTS outputs an IF signal, the signal will require further upconversion in the hub RF unit 23 to the downstream frequencies, e.g 500–600 MHZ.

In addition to the CMTS, the hub includes a transmitter 22 in a hub ODU 21, and a hub RF unit 23. The RF unit 23 and transmitter 22 translate the downstream signals to a suitable frequency range for wireless transmission. The translation need not be frequency-agile, unless the CMTS outputs IF frequencies. The frequency-translated, or wireless, downstream signals are then broadcast using an antenna (not shown) on a tower 24. The wireless downstream signals are received by the subscriber ODU 26. The subscriber ODU 26 frequency translates the wireless downstream signals to standard downstream frequencies, e.g. 500–600 MHZ. The frequency translation need not be agile, so a fixed synthesizer may be used in the frequency translator. The ODU 26 then provides the downstream signals to a standard cable modem 27, which in turn demodulates the signals and provides the demodulated data to an Internet user, for example a personal computer 28.

In the upstream direction, the cable modem 27 receives data from the personal computer 28 and modulates the data onto an upstream signal on an available upstream channel in the upstream frequency band, typically between 5–42 MHZ. This is the United States standard—in Europe, the upstream frequency band is typically between 5–65 MHZ, and in Japan it is typically between 5–48 MHZ. While the present invention is described by referring to the 5–20 MHz standard employed in the U.S., it is understood to those skilled in the art that the present invention is applicable to other frequency ranges such as those employed in Europe and Japan. The cable modem 27 provides the upstream signal to the subscriber ODU 26. The subscriber ODU 26 then translates the entire upstream frequency band from 5–42 MHZ to a wireless transmission frequency. This wireless transmission frequency is sufficiently separated in frequency from the wireless transmission frequency used to broadcast the downstream signals so that, unlike the MMDS-based wireless cable, separating the signals does not require extensive processing or filtering. The wireless upstream signal is then received at the hub ODU 21, where one or more receivers 25, along with the hub RF unit 23, frequency translates the signal back to the 5–42 MHZ upstream frequency band for processing by the CMTS 20.

Figure 2:
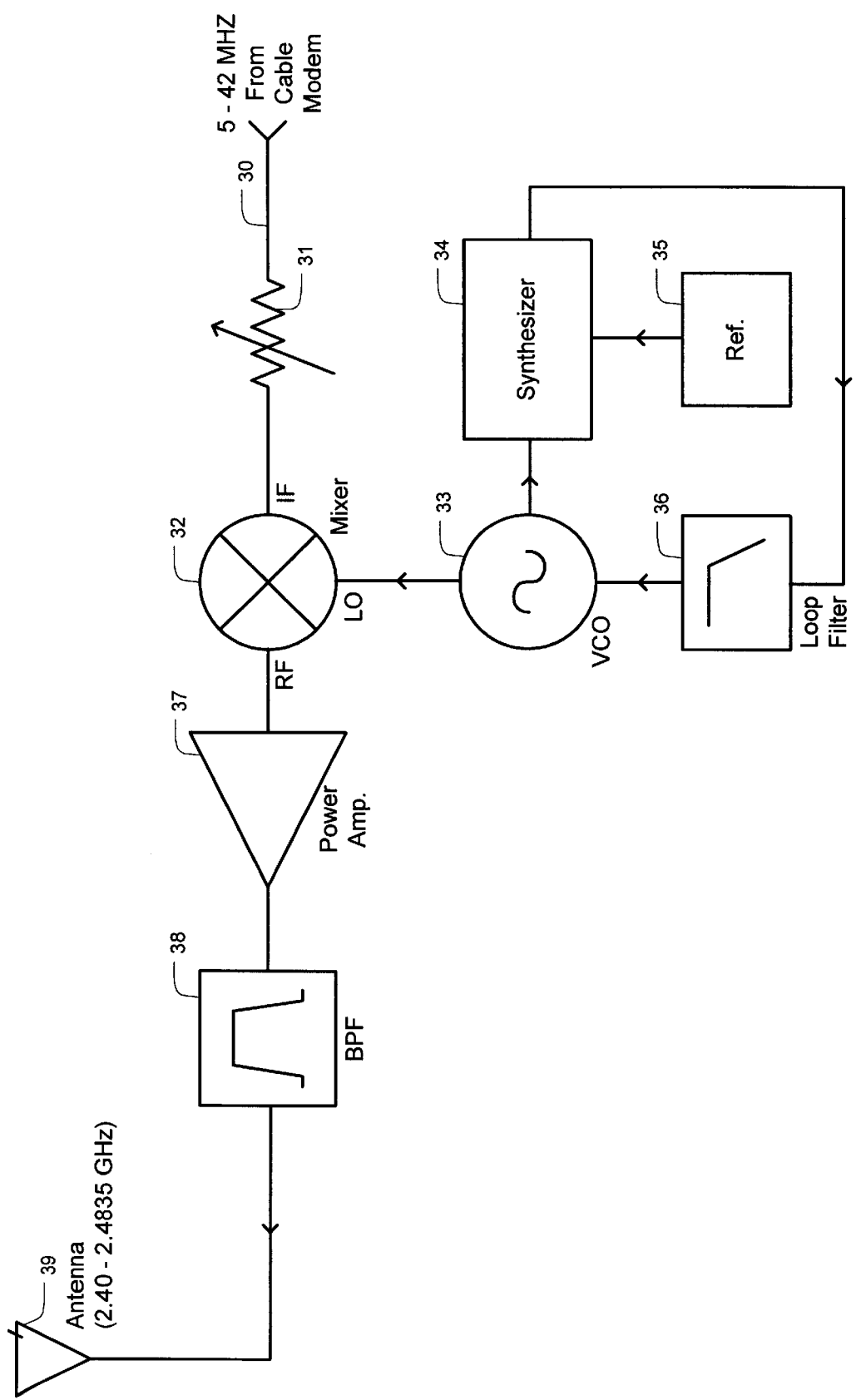
FIG. 2 illustrates an embodiment of an upstream transmitter for use at the subscriber end of a wireless cable system in accordance with an embodiment of the present invention.

The subscriber ODU 26 performs frequency translation from the upstream frequency band of 5–42 MHZ to a wireless transmission frequency using a frequency translator, also called an upconverter. The frequency translator provides adjustable gain. An exemplary frequency translator is shown in FIG. 2. In this frequency translator, the upstream frequency band enters at an input node 30, and its power level is adjusted by a potentiometer 31. The frequency is then converted, using a mixer 32, with a local oscillator signal to the desired wireless transmission frequency.

The local oscillator signal is produced by a voltage controlled oscillator (VCO) 33. The VCO receives a filtered signal from a synthesizer 34. The synthesizer 34 produces the phase locked signal, which is a multiple of a reference frequency produced by a high-stability reference 35. The feedback loop shown between the VCO 33 and the synthesizer 34 locks the phase of the VCO 33 with the phase of the high-stability reference 34 using a phase comparator in the synthesizer 34. Filtering of the synthesizer signal is provided by a low-pass loop filter 36. The mixer 32 translates the upstream frequency band to the desired wireless center frequency. The upconverted band is then amplified by the power amplifier 37, bandpass filtered by the filter 38, and provided to the transmitting antenna 39 for transmission. The antenna 39 is the output node of the frequency translator in the subscriber ODU. An omnidirectional antenna such as a quarter wave vertical antenna may be used. Thus, the direction toward the hub need not be considered when installing the subscriber ODU. Alternatively, a directional antenna may be used.

The power output by the antenna 39 is advantageously controlled, such that the average field strength is within the limits established by the FCC. These limits are described in 47 C.F.R. 15, incorporated herein by reference. In particular, within the bands 902–928 MHZ, 2400–2483.5 MHZ, and 5725–5875 MHZ, the average field strength of the fundamental output, measured at 3 meters, is limited to 50 millivolts per meter. Within the band 24.0–24.25 GHz, the average field strength is limited to 250 millivolts/meter.

Preferably, the average field strength is controlled by limiting the duty cycle of the transmitted data. The duty cycle may be limited by controlling the timing of the signals output by the ODU. In a preferred embodiment, the CMTS 20 communicates with the cable modem 27 over the downstream channel. The CMTS 20 is programmed to control the burst timing and burst size of cable modem 27. The cable modem 27 outputs the modulated upstream data having burst timing (e.g., burst length and duty cycle) and power level as directed by the CMTS 20. The duty cycle is the ratio of the burst length to the time between bursts. For example, if bursts are limited to 10 milliseconds in length, with 100 milliseconds between bursts, the duty cycle is 10%. A controlled duty cycle of no more than 10%, with proper gain control in the transmission path provided by the potentiometer 31, is sufficient to limit the maximum average field strength to 50 millivolts/meter, as required for the band 2.4–2.4835 GHz. The duty cycle may be controlled by sending commands to the cable modem 27 from the CMTS 20.

Alternate Embodiments

Figure 4:
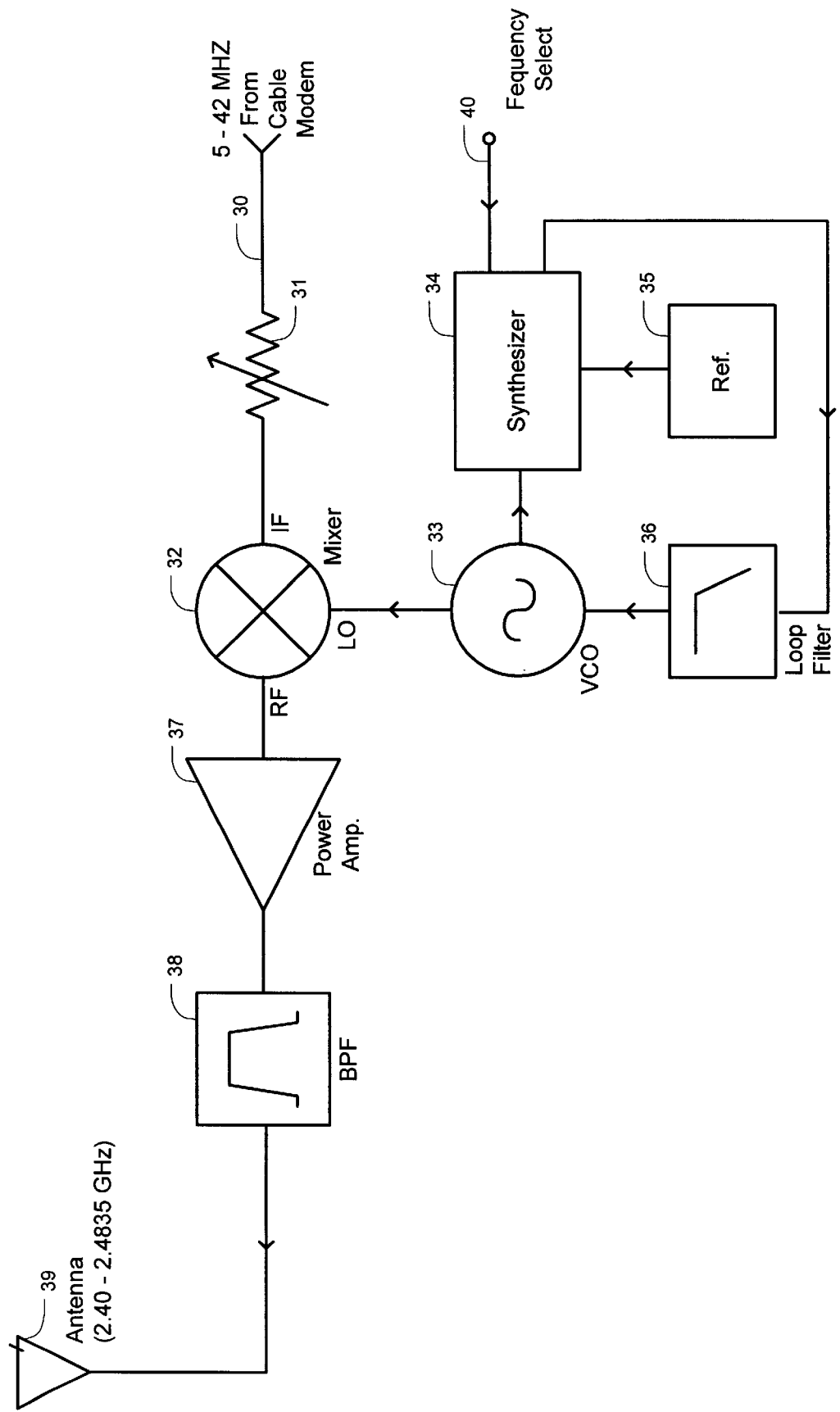
FIG. 4 illustrates an alternative embodiment of an upstream transmitter for use at the subscriber end of a wireless cable system.

In an alternative embodiment of the claimed invention, the frequency translator produces wireless upstream signals in a selectable band. An exemplary frequency translator capable of producing wireless signals in a selectable band is illustrated in FIG. 4. The synthesizer 34, instead of producing a single local oscillator frequency, selectably produces several different local oscillator frequencies. An input at node 40 is provided to select a local oscillator frequency, which in turn determines the center frequency within the wireless band to which the upstream frequency band will be translated. An advantage of this approach is that if one of the available center frequencies is affected by interference in a given geographic area, or at a given time, another center frequency may be selected. A switch may be provided at node 40, permitting a center frequency to be manually selected during installation of the ODU. Alternatively, such frequency also may be controlled by a command issued by the CMTS 20.

Figure 5:
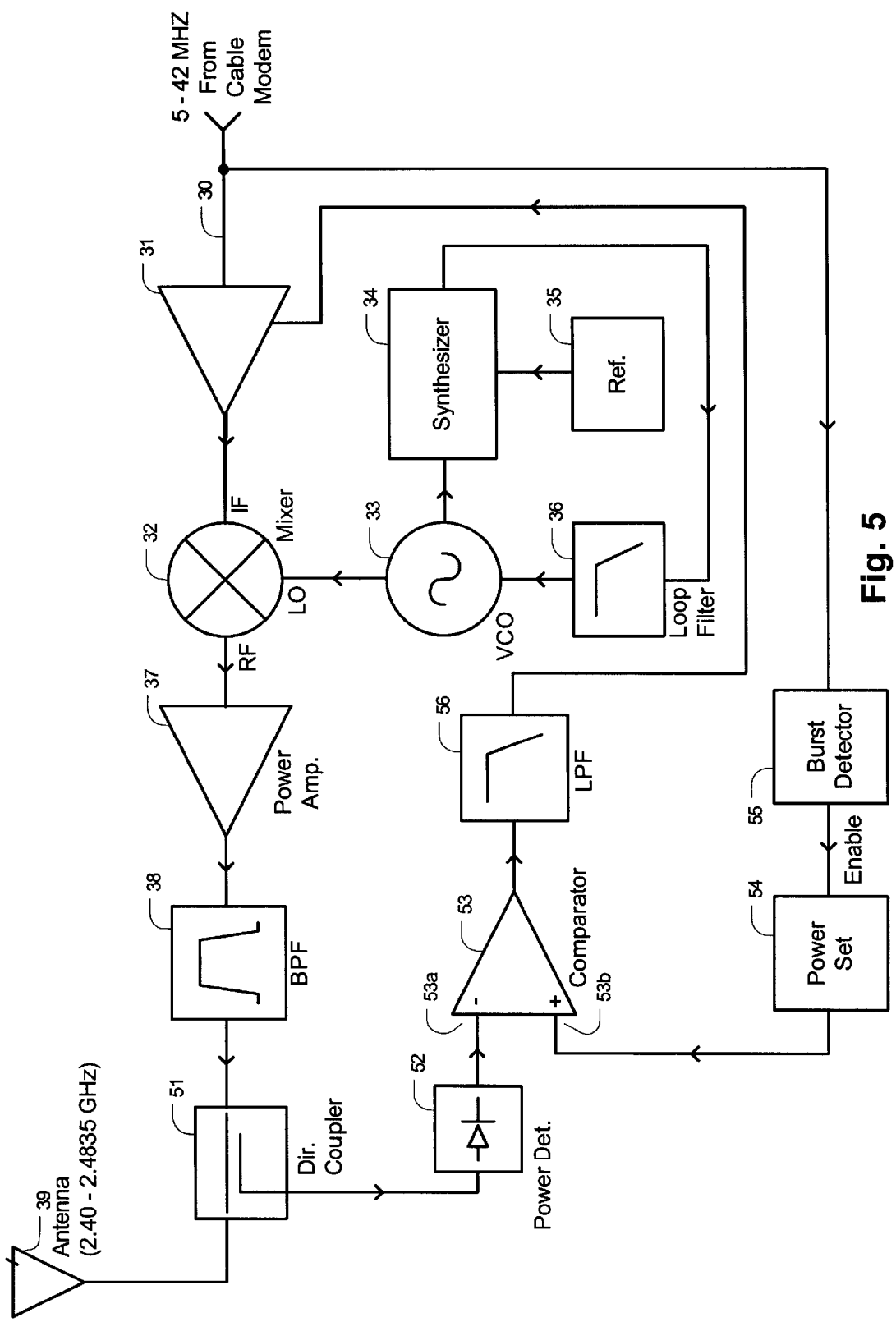
FIG. 5 illustrates an alternative embodiment of an upstream transmitter for use at the subscriber end of a wireless cable system.

In an alternative embodiment of the claimed invention, the frequency translator provides variable gain to more accurately constrain the average field strength of the wireless upstream signals. If the CMTS does not constrain the average field strength with sufficient accuracy, the variable gain of the frequency translator will compensate. An exemplary frequency translator with variable gain is illustrated in FIG. 5. In this exemplary frequency translator, a variable gain amplifier 50 is provided in place of the potentiometer 31. This increases the speed and accuracy with which the average field strength is constrained. In one embodiment, the variable gain amplifier also advantageously permits different selectable duty cycles to be used: if the duty cycle is decreased, the gain of the variable gain amplifier 50 may be increased. The gain is controlled by a signal generated by a feedback circuit, which includes a directional coupler 51 which taps off a fraction of the transmission signal from the output of the bandpass filter 38, and runs the signal through a rectifier 52. The DC output of the rectifier 52 is provided to the negative input 53a of a comparator 53.

The input at node 30 from the cable modem 27 is provided to a burst detector 55, which provides an enabling signal to a power control circuit 54. If there is a signal present at the input node 30, the burst detector 55 will enable the power control circuit 54 to control the gain of the variable gain amplifier 50. The burst detector 55 ensures that the gain of the amplifier will not be increased to a high level in the absence of a signal at the input node 30.

The power control circuit 54 produces a signal with an amplitude corresponding to the maximum signal level which may be provided to the antenna 39. The signal is provided to the positive input 53b of the comparator 53. Thus, if the rectified amplitude of the output of the directional coupler 52 is less than the amplitude of the DC signal output by the power control circuit 54, the output of the comparator 53 will be positive; otherwise, the output of the comparator will be negative. The comparator output is low-pass filtered by a filter 56, and the filtered signal is provided to the control input 50a of the variable gain amplifier 50.

The power control circuit 54 may set the negative input 53a of the comparator 53 to a fixed DC, when the power control circuit 54 is enabled by the burst detector 55. Alternatively, if the duty cycle is selectable, a power control template must be provided to set the maximum power level based upon the duty cycle. For example, the power control circuit 54 may include an envelope detector to estimate the duty cycle, and circuitry to determine the maximum power level based upon the duty cycle. For example, to meet the FCC requirements for the unlicenced band 2.4–2.4835 GHz, if the duty cycle is 100%, the output power must be constrained to approximately 1 mW. However, if the duty cycle is 10%, the output power may be increased to 100 mW. Duty cycles between 10% and 100% may be used if the output power level is adjusted accordingly.

Alternatively, a DC signal corresponding to the desired output level could be provided at the positive input 53b of the comparator 53, obviating the need for the burst detector 55 and the power control circuit 54. However, this would require that the duty cycle be fixed, because the output level could not be adjusted as a function of the duty cycle. Additionally, noise might be introduced into the system since the gain of the variable gain amplifier 50 will increase when there is no signal present.

The maximum signal level to be output by the antenna 39 depends upon the duty cycle and the wireless band used for upstream transmission. For example, if the band 2.430–2.4835 GHz is used, and a 10% duty cycle is maintained, the maximum power output is approximately 100 mW. This is because the FCC limits the average field strength to 50 millivolts/meter at three meters which, with an omnidirectional quarter wave antenna, corresponds to approximately 1 mW provided to the antenna at a 100% duty cycle. When a 10% duty cycle is applied to the transmitted signal, the power output may be increased by 20 dB, corresponding to 100 mW.

Figure 3:
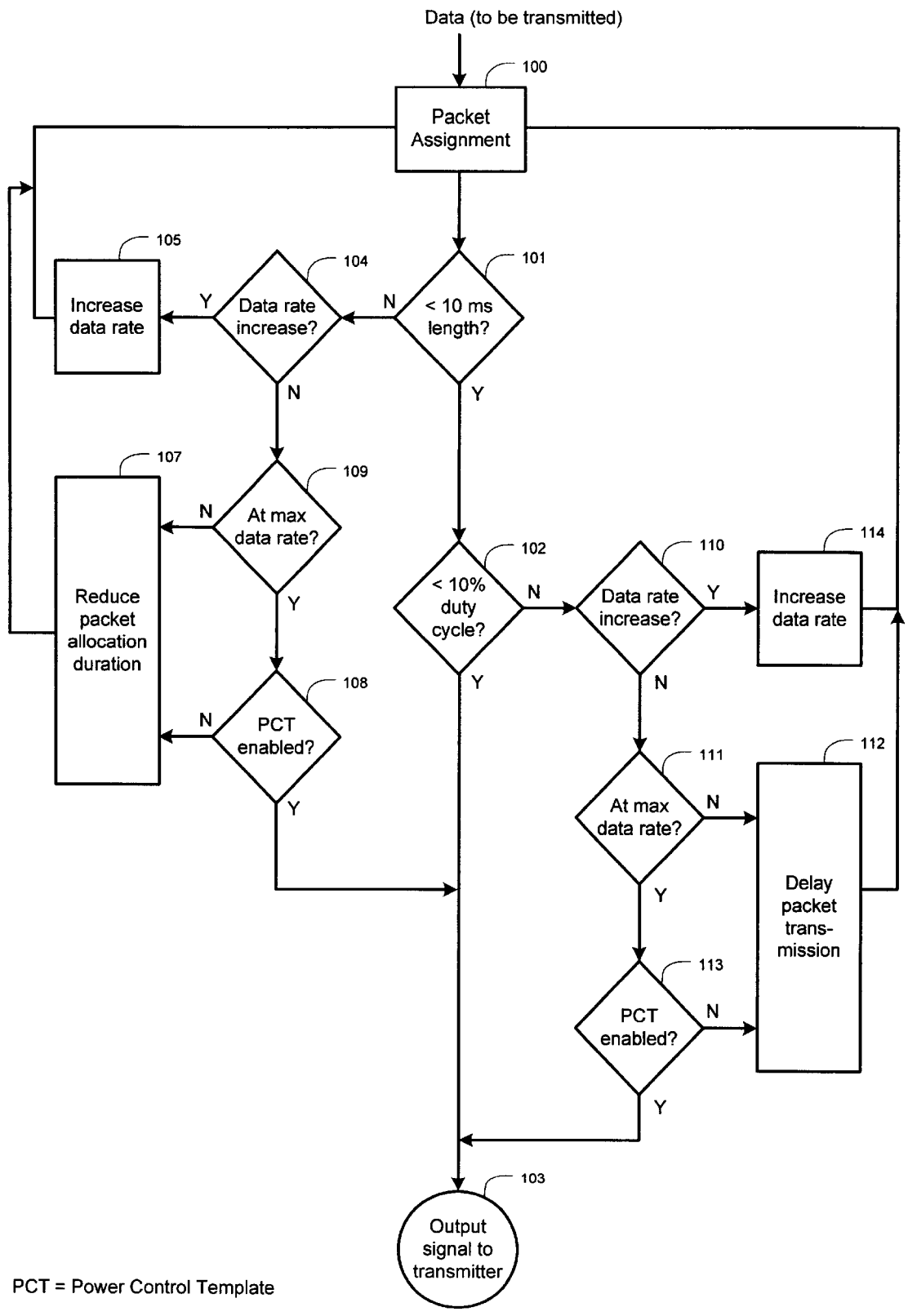
FIG. 3 illustrates a block diagram of the software functions performed by the CMTS to control the cable modem in accordance with an embodiment of the present invention.

The CMTS 20, which transmits commands to the cable modem 27, includes software to control the upstream burst length and burst timing so as to limit the field strength. A block diagram of the software functions is shown in FIG. 3. Data to be transmitted by the cable modem 27 receives a packet assignment 100 from the CMTS. If the packet is less than the maximum length, e.g., 10 ms 101 corresponding to the maximum duty cycle, e.g., 10% 102, the CMTS instructs the cable modem 27 to transmit the packet 103. However, if the packet is greater than the maximum length 101, the data rate may be increased 104. If the increase in the data rate 105 results in a packet assignment 100 less than the maximum length 101 for the duty cycle 102, the packet may be transmitted 103. If the data rate is not to be increased, the packet allocation duration, or packet size, may be reduced 107. Alternatively, if the data rate is at its maximum, but the power control template is enabled 108, the signal may be transmitted 103. The power control circuit 54 will then limit the output power level in accordance with the duty cycle, so that the average field strength is still properly constrained.

If the burst length is less than the maximum 101, but the duty cycle is greater than the maximum 102, the data rate may be increased 110. If the data rate is not at its maximum 111, but the data rate is not increased, packet transmission is delayed 112. If the data rate is at its maximum 111 and the power control template is enabled 113, the packet may be transmitted 103, and the power control circuit 54 will limit the output power level. If the data rate is at its maximum and the power control template is not enabled, packet transmission is delayed 112.

As discussed above, the synthesizer 34 in the exemplary frequency translators for each of the embodiments is provided with a reference signal from a high-stability reference 35. The reference is required to ensure that the frequency drift requirements of the CMTS and the cable modem 27 are met. For a DOCSIS standard cable modem, the frequency stability is specified at no more than 50 ppm. The stability required in the reference 35 depends upon the wireless transmission frequency used for upstream transmission: for example, if the wireless transmission frequency band is 2.4–2.44 GHz, and the frequency drift of the cable modem is limited to 25 ppm, the frequency of the lowest frequency component of the upstream signal increases by a factor of 480, so that the drift of the reference 35 must be limited to 0.05 ppm to maintain an overall frequency drift of 50 ppm.

Figure 6:
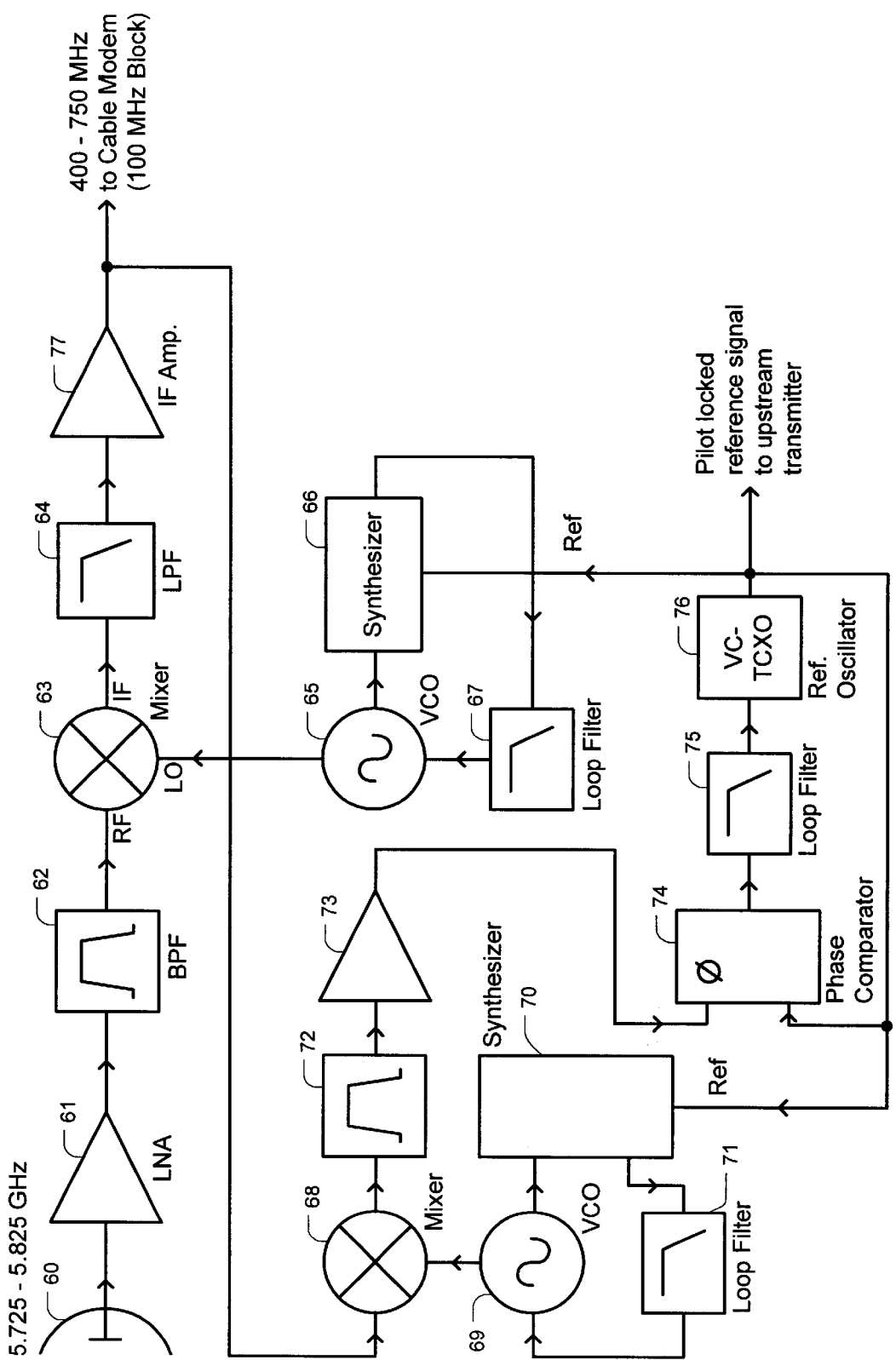
FIG. 6 illustrates an embodiment of a downstream receiver for use at the subscriber end of a wireless cable system.

Alternatively, to achieve stability and/or obviate the need requirement for a separate reference oscillator, the reference signal to the synthesizer 34 may be provided by a pilot tone embedded in the downstream signal. This pilot tone may be provided instead of, or in addition to, the high-stability reference 35 in each subscriber ODU 26. FIG. 6 illustrates an exemplary downstream frequency translator for the subscriber ODU 26 which includes an exemplary circuit for extracting the pilot tone and using it as a reference for the synthesizer in the receiver. The pilot tone could also be used as a reference for the synthesizer 34 in the upstream frequency translator illustrated in FIGS. 1, 2, 4 and 5.

In the exemplary downstream frequency translator, the wireless downstream signal is received at an antenna 60, preferably a directional antenna, and amplified by a low noise amplifier 61. The wireless downstream signal is then filtered by bandpass filter 62, and provided to a mixer 63. The mixer 63 receives a local oscillator signal to translate the incoming wireless downstream signal to the desired output frequency. The downstream signal typically occupies a 100 MHZ bandwidth, within the frequency range 450–750 MHZ. The mixer 63 downconverts the wireless downstream signal to the desired downstream frequency band. The downstream signal is then filtered by a low pass filter 64 further amplified by IF amplifier 77, and provided to the cable modem 27 for demodulation and transmission to the user 28.

The local oscillator signal received by the mixer 63 is generated by a VCO 65. The VCO 65 is driven by the output of a synthesizer 66 after filtering by a loop filter 67. The synthesizer 66 also downconverts a reference signal, the pilot tone embedded in the downstream wireless signal. The synthesizer 66 locks the desired local oscillator frequency, and the phase of the VCO 65 to the phase of the pilot tone.

To extract the pilot tone, the downstream signal is tapped off at the output of the low pass filter 64, and provided to a second mixer 68. The mixer 68 also receives a signal from a second VCO 69, and outputs a signal at a frequency equal to the difference between the pilot tone, and the voltage controlled oscillator 69. The second VCO 69 receives a signal from a second synthesizer 70 after filtering by a second loop filter 71. The output of the mixer 68 is the pilot tone, mixed down to a frequency equal to the reference frequency. This signal is further amplified by amplifier 73 and filtered by filter 72, and through phase comparator 74 locks the VCTCXO or VC_TXO 76 by synthesizer 70. This signal may also be provided to the synthesizer 34 in the upstream frequency translator of the subscriber ODU 26, in place of the reference 35.

As discussed above, the upstream frequency translator in the subscriber ODU 26 may upconvert the upstream band to more than one sub-band within the wireless band. For example, in FIG. 1, the output of the mixer 32 may include wireless upstream signals in both the sub-band centered at the local oscillator plus the center frequency of the incoming upstream band, and the local oscillator minus the center frequency of the incoming upstream band. If the passband of the bandpass filter 38 is wide enough to pass both sub-bands, then both will be transmitted. If the bandpass filter 38 is narrow enough then only one sub-band is transmitted.

Figure 7:
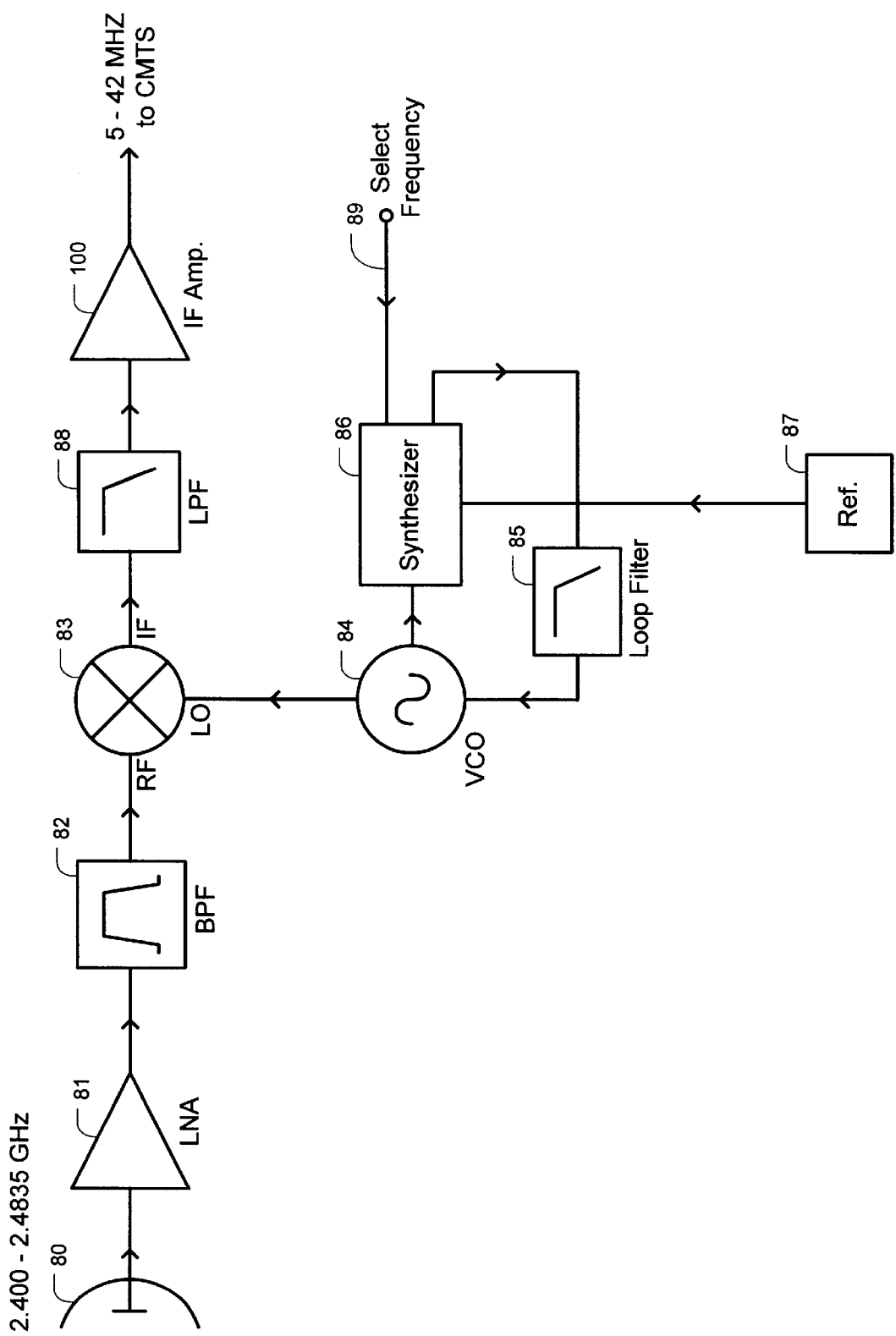
FIG. 7 illustrates an embodiment of an upstream receiver for use at the headend of a wireless cable system.

The CMTS is capable of identifying noisy channels, and therefore could instruct the upstream frequency translator at the hub end or headend to select the most noise-free of the two sub-bands for downconversion to the upstream frequency band. An exemplary upstream frequency translator at the hub end is illustrated in FIG. 7. It translates the wireless upstream signal from the wireless transmission band to upstream frequency band.

The frequency translator receives the wireless upstream signal at the antenna 80. The antenna 80 is preferably a high-gain antenna. The received wireless upstream signal is amplified by a low noise amplifier 81 and filtered by a band-pass filter 82.

A mixer 83 downconverts the wireless upstream signal to the frequency band, typically 5–45 MHZ. The mixer 83 receives a local oscillator signal at a frequency corresponding to the difference between the frequencies of the incoming wireless upstream signal and the desired output signal. The output of the mixer 83 is filtered by a low-pass filter 88, amplified by IF amplifier 100, and then provided to the CMTS 20.

The local oscillator signal received by the mixer is generated by a VCO 84. The VCO 84 is driven by the output of a loop filter 85, which filters the output of a synthesizer 86. The synthesizer 86 is driven by the output of the VCO 84 and a high-stability reference 87. The synthesizer 86 provides the local oscillator frequency of the VCO 84, phase-locked to the reference signal provided by the high-stability reference 87.

The synthesizer 86 may optionally include a selection input 89, which controls the synthesizer frequency. The selection input signal may be provided by the CMTS 20, based upon an analysis of the noise in each of the sub-bands transmitted upstream by the subscriber ODU 26. Alternatively, an adaptive image rejection receiver, such as the exemplary adaptive image rejection receiver shown in FIG. 8, may be used. This adaptive receiver provides a simplified approach to selecting the desired wireless upstream signal, if the transmitted wireless upstream signals are two signals which are the upper and lower sidebands produced by a single upconversion.

The wireless upstream signal is received at the antenna 80, filtered by the RF filter 99, and amplified by the low-noise amplifier 81. The image-reject mixers 90 and 91 multiply the upstream wireless signal by the sine and cosine of the desired downstream center frequency, respectively. The resulting downconverted in-phase and quadrature-phase signal components are then low-pass filtered by filters 93 and 94. The quadrature-phase signal component is then shifted by either −90° or +90°, depending on whether the upper sideband or lower sideband is selected by the decision logic 98. The resultant signal is then added to the downconverted, filtered in-phase component using adder 96. The summed signal is filtered by filter 97, amplified by amplifier 101, and output to the CMTS 20.

Figure 8:
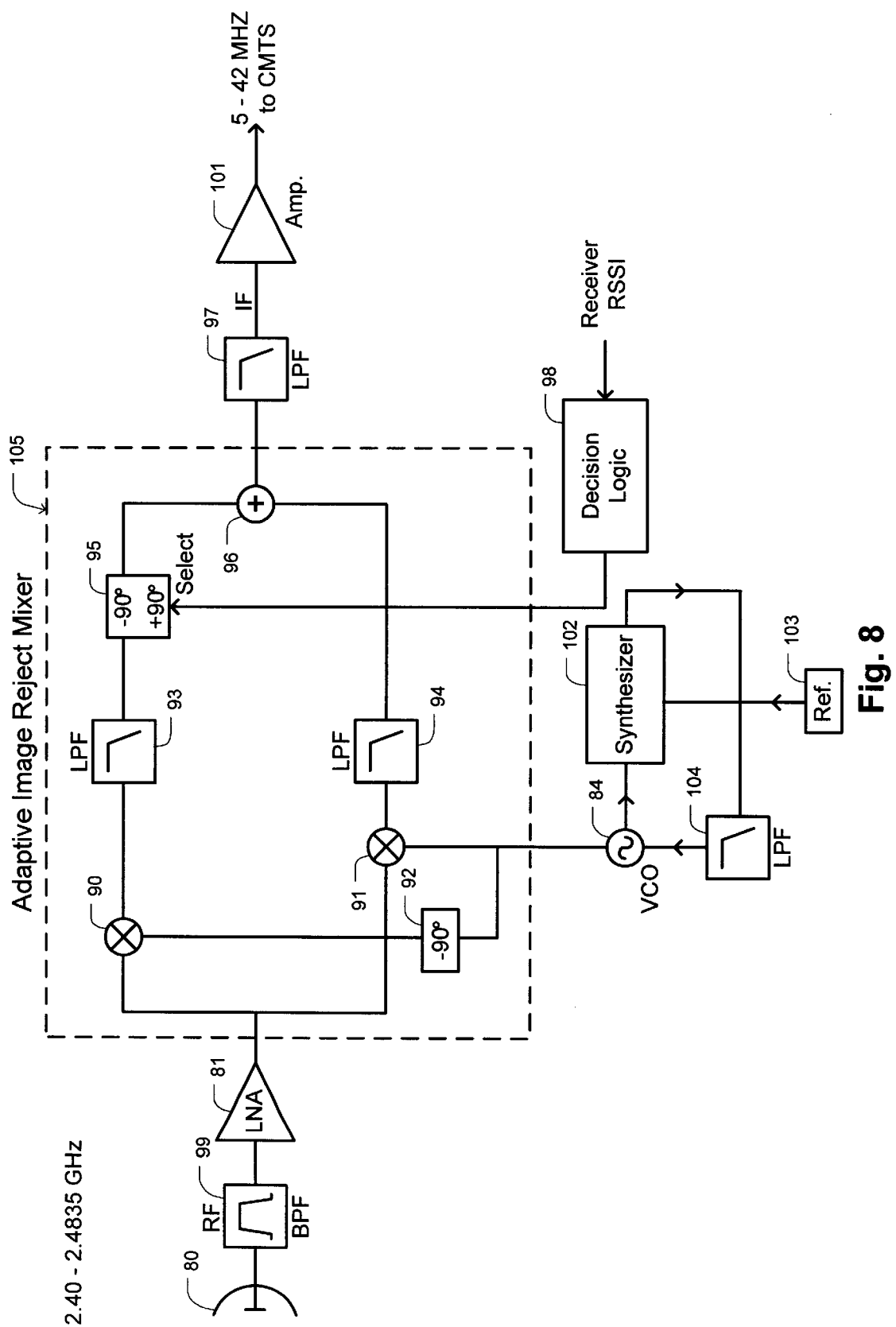
FIG. 8 illustrates an embodiment of an adaptive image rejection upstream receiver.
Figure 9:
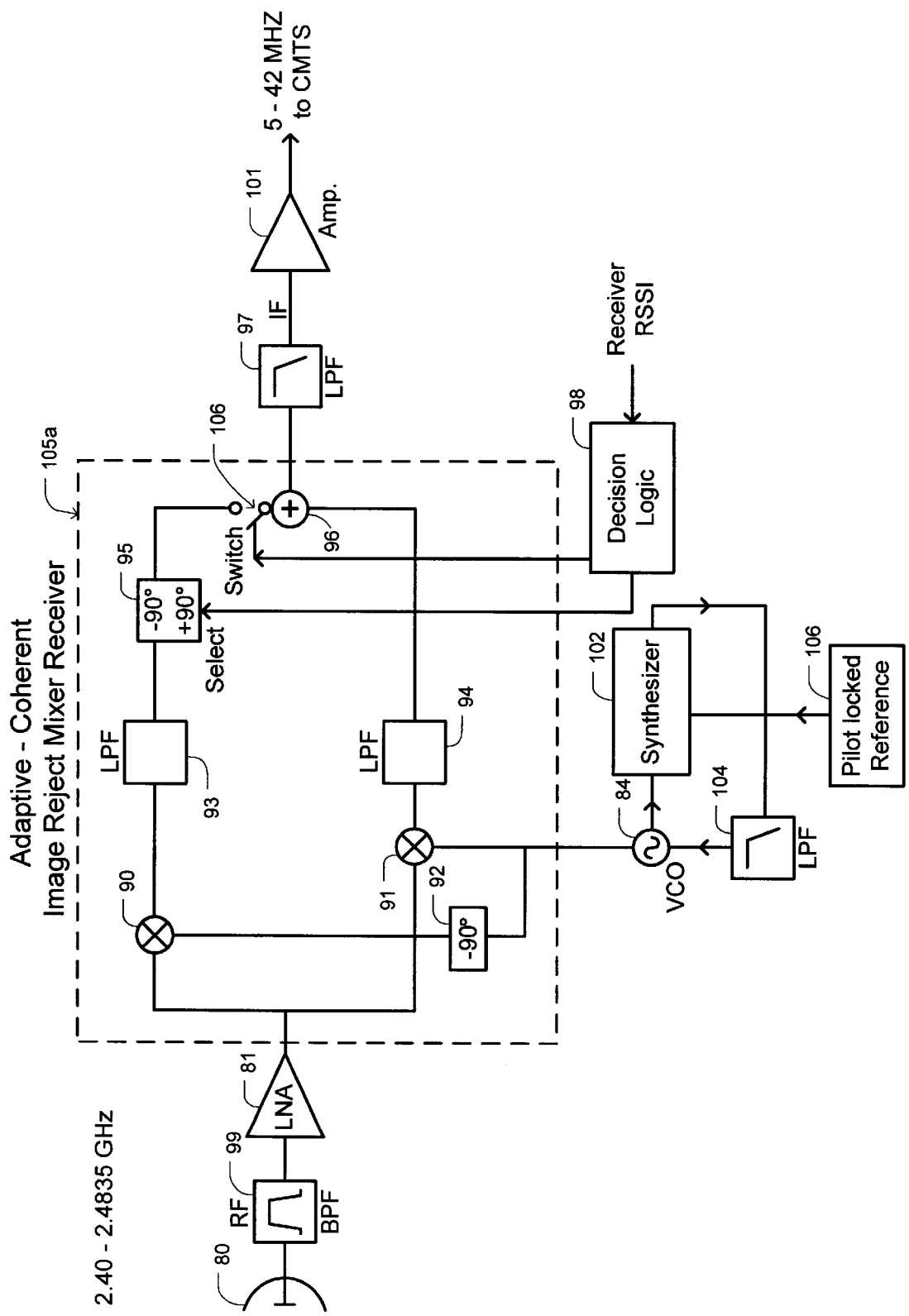
FIG. 9 illustrates an embodiment of an adaptive coherent image rejection upstream receiver.

The adaptive image reject mixer receiver of FIG. 8 can be further expanded to include a third decision possibility, which may be selected when both the upper and lower sideband frequencies do not contain interference as determined by the CMTS 20 at the headend location. When both sidebands are interference free, the upper and lower sidebands can be combined provided phase coherency is maintained between the transmitter upconverter and the receiver downconverter. This is shown in FIG. 9, where one "leg" of the image reject mixer 105 (inside the dotted lines) is turned off, effectively causing both sidebands to be converted to the same IF frequency. The advantage to combining both sidebands is +3 dB in signal to noise ratio. This improvement would be useful in receiving upstream signals which were on the periphery of the coverage area, and preserves maximum performance when no interference is present.

The requirement for phase coherency is met by utilizing a pilot reference transmission system, such as the one shown in FIG. 6, where the headend reference signal is used to lock the upstream transmitter reference.

The frequency translators discussed above each used only one stage of frequency translation—that is, one mixer to translate the frequency of the input signal. However, frequency translators with multiple stages are also well-known in the art and may be used instead of the single-stage frequency translators described herein.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown at the block diagram level in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, as obviously many modifications and variations are possible in view of the above teachings. The embodiments were chosen and described in order to best explain the principles of the invention and its practical applications, the thereby enable others skilled in the art to best utilize the invention and various embodiments with various modifications as are suited to the particular use contemplated. It is intended that the scope of the invention be defined by the following claims and their equivalents.

What is claimed is:

1. An apparatus for providing upstream data transmission, comprising:

a frequency translator comprising an input node that is capable of accepting upstream signals in an upstream frequency band and an output node, said frequency translator processing said upstream signals to produce wireless upstream signals in one or more sub-bands at said output node, the wireless upstream signals having an average field strength, a duty cycle which is controlled so as to constrain the average field strength to be no greater than a predetermined maximum value, and a bandwidth approximately equal to the bandwidth of said upstream signals in the upstream frequency band.

2. The apparatus of claim 1, wherein the frequency translator outputs the wireless upstream signals in one of two or more selectable sub-bands.

3. The apparatus of claim 1, wherein the frequency translator is capable of producing wireless upstream signals in a plurality of separate sub-bands at the output node.

4. The apparatus of claim 1, wherein the wireless upstream signals are transmitted in bursts and the length and separation of the bursts are controlled to constrain the duty cycle to within a maximum value.

5. The apparatus of claim 4, wherein the frequency translator further comprises a variable gain amplifier.

6. The apparatus of claim 5, wherein the maximum value of the duty cycle is selectable, and the variable gain amplifier has a variable gain which is a function of the selectable maximum value of the duty cycle.

7. The apparatus of claim 1, wherein the wireless upstream signals have frequency drift which is constrained to within a maximum value.

8. The apparatus of claim 7, wherein the frequency translator further comprises a high-stability frequency reference to constrain the frequency drift.

9. The apparatus of claim 7, wherein the frequency translator further comprises a second input node for receiving a pilot reference signal to constrain the frequency drift.

10. The apparatus of claim 9, wherein the pilot signal is embedded in a downstream signal.

11. The apparatus of claim 7, wherein the wireless upstream signals are within the frequency range of 2400 MHZ to 2483.5 MHZ.

12. The apparatus of claim 11, wherein the average field strength of the upstream signal output at the output node is constrained to be less than a maximum of 50 millivolts/meter measured at a distance of three meters.

13. The apparatus of claim 12, wherein the bursts are transmitted with a duty cycle of no more than 10%.

14. The apparatus of claim 13, wherein the duty cycle is selectable and processing by the frequency translator provides variable gain.

15. A method of transmitting data upstream, comprising:
receiving upstream signals in an upstream frequency band from a cable modem;
translating the upstream signals from the upstream frequency band to one or more wireless bands; and
generating wireless upstream signals for wireless transmission;
wherein the average field strength of the wireless upstream signals is constrained to no greater than a maximum value and said translating includes constraining the frequency drift of the wireless upstream signals within predetermined limits; and
receiving a downstream signal; and
extracting a pilot signal embedded in the downstream signal;
wherein the pilot signal provides a stable reference for said translating whereby the frequency drift of the wireless upstream signals is constrained.

16. A wireless communication system, comprising:
a first apparatus, including:
a wireless downstream output node on which wireless downstream signals are transmitted in a wireless downstream frequency band;
a second apparatus, including:
a cable modem that produces upstream signals in an upstream frequency band;
a wireless communication device, comprising:
a wireless downstream input node for accepting the wireless downstream signals from the wireless downstream output node;
an upstream input node for accepting the upstream signals; and
an upstream frequency translator that produces from the upstream signals, at an upstream output node, wireless upstream signals in one or more subbands, the wireless upstream signals having an average field strength, a duty cycle which is controlled so as to constrain the average field strength to be no greater than a predetermined maximum value, and a bandwidth approximately equal to the bandwidth of the upstream signals in the upstream frequency band; and
a third apparatus, including:
a wireless upstream input node for accepting the wireless upstream signals;
a frequency translator for producing signals from the wireless upstream signals.

* * * * *